Figure 1:
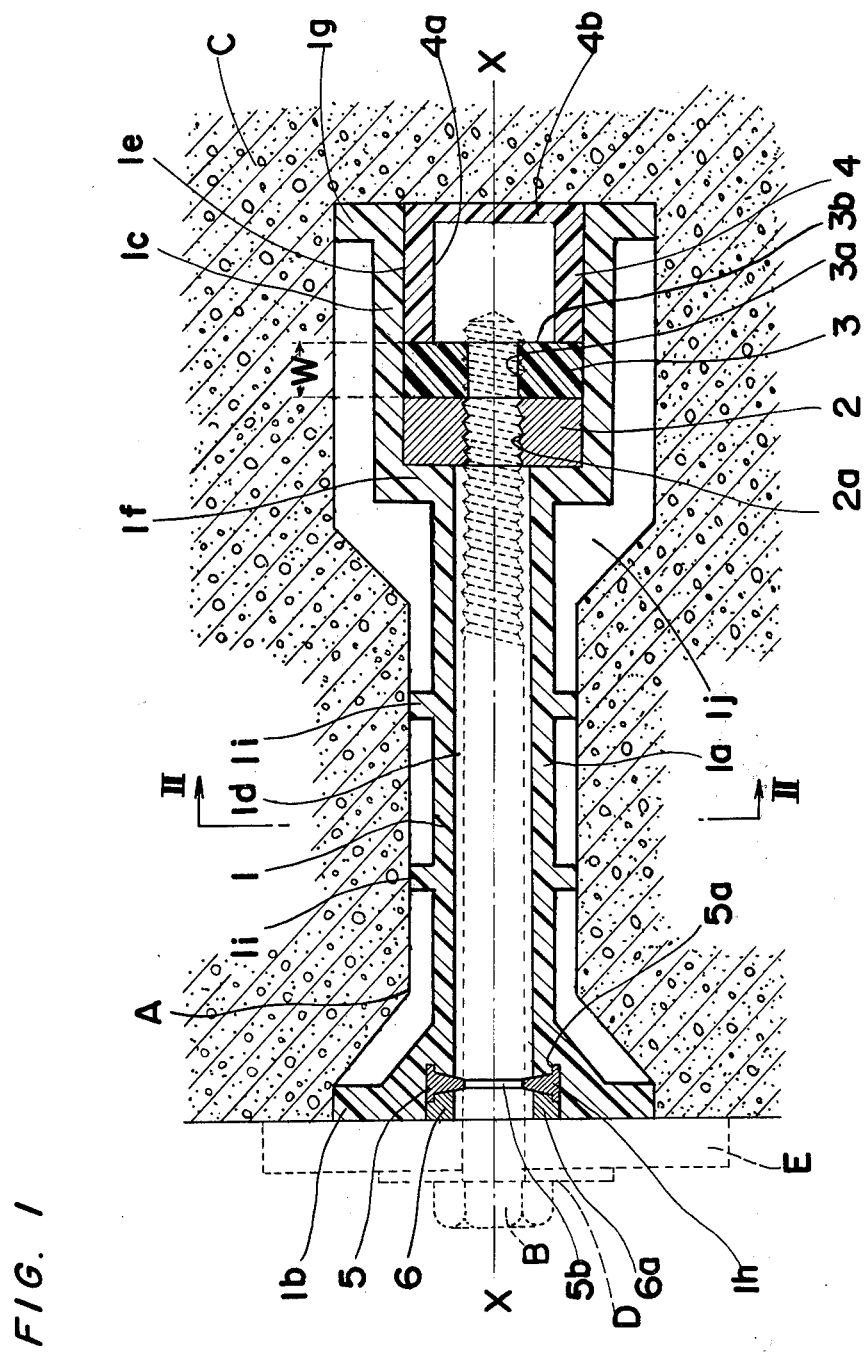

United States Patent [19]

Shimada

[11] 4,141,190

[45] Feb. 27, 1979

[54] BOLT-SEATING PLUG

[75] Inventor: Saburo Shimada, Nishinomiya, Japan

[73] Assignee: Sumitomo Rubber Industries, Ltd., Hyogo, Japan

[21] Appl. No.: 844,364

[22] Filed: Oct. 21, 1977

[30] Foreign Application Priority Data

Oct. 21, 1976 [JP] Japan .................. 51-142036[U]

[51] Int. Cl.² ............................................ E04B 1/41
[52] U.S. Cl. .................................................. 52/711
[58] Field of Search ............... 52/704, 707, 708, 711; 61/45 B; 151/41 R, 41.7, 41.76

[56] References Cited

U.S. PATENT DOCUMENTS

| 3,507,315 | 4/1970 | Tummarello | 151/41.7 |
|---|---|---|---|
| 3,640,328 | 2/1972 | Tummarello | 52/707 |

Primary Examiner—John E. Murtagh
Attorney, Agent, or Firm—Birch, Stewart, Kolasch and Birch

[57] ABSTRACT

Bolt-seating plug in which a bolt is secured by an inner end block means which is accommodated within the inner chamber of the plug having the shoulder wall wider than the central portion of the plug accommodating the shank of the bolt, whereby bolt-withdrawal force acts as a more easily resisted compressive force on the inner end block means, and which comprises a threaded nut through which the bolt is screwed, and a ring which is made of soft synthetic resin, through which the bolt is passed completely, partly by screwing and partly by forcing, and which has a thickness such that it may contribute to a required degree to bolt-holding force.

5 Claims, 2 Drawing Figures

BOLT-SEATING PLUG

The present invention relates to a seating plug for fixture of a bolt. More particularly, the invention relates to an improved bolt seating plug suited to fixture of bolts for mounting of fenders or similar elements in concrete structures such as jetties.

It is known to provide a bolt seating plug such as that disclosed in Japanese Utility Model Publication No. 51019776, according to which a main cylinder element made of rigid synthetic resin defines a central opening for insertion of a bolt and has provided in successive continuation to the inner end thereof, i.e., the end thereof which is innermost when it is located in a concrete or other structure in which a bolt is to be fixed, a threaded metal nut and a block of soft synthetic resin defining a cylindrical opening which is closed at one end and in which the tip of a bolt may be engaged. This construction gives good protection against corrosive elements such as sea water and permits a bolt to be firmly tightened. The main holding force is provided by the metal nut, and the block of soft synthetic resin permits final tightening of the bolt to be effected comparatively easily but also provides additional holding force to prevent loosening of the bolt. However, increasing torque must be applied as the bolt is screwed further into the synthetic resin block, and if this block has a thickness, i.e., a dimension in the direction of screwing-in of the bolt, which is comparable to the thickness of the metal nut, the force required to completely seat the bolt in the plug may be sufficient to cause splitting of the synthetic resin block, with the result that bolt-holding force of the plug is considerably reduced.

Further, in such a bolt-seating plug, since the pulling out force which is applied on an inserted bolt acts as a tensile force or shear force on the main cylinder element made of rigid synthetic resin, there is a risk of the cylinder element also being broken.

It is accordingly principal object of the invention to provide a bolt-seating plug which permits final tightening of a bolt to be erected easily, comprises an element exerting a supplementary holding force on an inserted bolt, but which does not risk being damaged by an inserted bolt.

It is another object of the invention to provide a bolt-seating plug which provides a bolt with improved protection against corrosive elements, and there is no risk of the bolt being broken.

In accomplishing these and other objects, there is provided, according to the present invention, a bolt-seating plug comprising a cylindrical body made of rigid synthetic resin having a central portion which defines a central hole with a diameter slightly greater than that of a bolt to be inserted, a fixture block which is provided in integral continuation to the inner end of said central portion and defines an inner chamber communicating with said central hole and having a polyhedron configuration with greater transverse dimensions than the cross-sectional area of said central hole by the provision of a shoulder wall between said central hole and inner chamber, and a number of radially or longitudinally disposed ribs provided on the outer surfaces of said central portion and fixture block as projections, a seal means provided in the entrance of said central hole to close a gap between said central portion and bolt, and a block means provided within said inner chamber and including a metal nut which is accommodated in and has an outer surface in contact with said shoulder wall of said inner chamber and defines a threaded through-hole for permitting said bolt to be screwed therethrough, a ring made of soft synthetic resin which is accommodated in said inner chamber contacts with the inner surface of said nut and has an through hole for permitting said bolt to be bitten therethrough and a thickness such that it may contribute to a required degree to bolt-holding force but that force required to screw the bolt therethrough is not liable to cause breaking of said ring and bolt, and a retainer element which is accommodated in said inner chamber, holds said ring and nut in the outermost portion of said inner chamber, and defines an open space large enough to permit unhindered entry thereinto of the end portion of said bolt. With this construction a bolt may be completely seated and held, but since the bolt passes completely through the synthetic resin ring when it is almost completely seated, there is no risk of imposition of force liable to break the synthetic resin ring, and the synthetic resin ring with a thickness effective to produce a tightening torque of value which is not larger than a certain value to be caused to damage the bolt may effectively act to assist holding of the bolt in the seating plug. Also, since the fixing block at the inner chamber of the plug made of rigid synthetic resin has a diameter larger than that of the central portion of the cylindrical body the force acting to withdraw an inserted bolt acts as a compressive force on the shoulder wall of the inner chamber, and is therefore much less liable to cause breakage of the cylindrical body of the plug.

According to the invention there is also provided at the outer end of the cylindrical body sealing means comprising a packing element and a retainer ring which serve to prevent entry of water into the cylindrical body, and so protect a seated bolt from corrosion.

Figure 2:
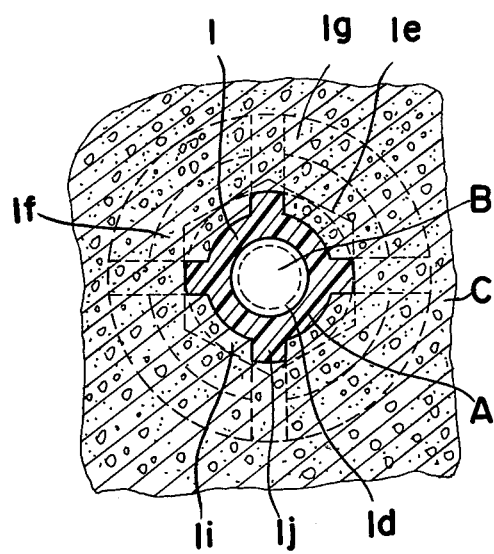

A better understanding of the present invention may be had from the following full description of one preferred embodiment thereof when read in reference to the attached drawings in which;

FIG. 1 is a cross-sectional view of a bolt-seating plug according to the preferred embodiment of the invention, and FIG. 2 is a cross-sectional view taken along a line II—II of FIG. 1.

As shown in FIG. 1, a bolt-seating plug A comprises a cylindrical body 1 made of rigid synthetic resin having a central hole 1a and an inner chamber 1d, a seal element provided in the entrance of said central hole 1d and including a rubber packing element 5 and a retainer metal ring 6, and a block means accommodated within said inner chamber 1d and including a metal nut 2, a ring 3 made of soft synthetic resin and a retainer element 4 made of synthetic resin. The cylindrical body 1 comprises a central portion 1a which defines the central hole 1d with a diameter slightly greater than that of a bolt B to be inserted, a fixture block 1c which is provided in integral continuation to the inner end of said central portion 1a and defines the inner chamber 1e communicating with said central hole 1d and having a polyhedron configuration with greater transverse dimensions than the cross-sectional area of said central hole 1d by the provision of a shoulder wall 1f between said central hole 1d and inner chamber 1e, and a number of radially disposed ribs 1i and longitudinally disposed ribs 1j which are integrally provided as projection onto the outer surface of said cylindrical body 1. The outer end of said central portion 1a defines an outer flange 1b an outer surface generally flush with the surface of a concrete structure C in which a bolt B, indicated by the dashed line portion of FIG. 1, is to be fixed. The axis X—X of said cylindrical body 1, i.e., the axes of said central portion 1a and fixture block 1c are normal to the surface of the structure C and parallel to the axis of the bolt B. In transverse cross-section i.e., at right-angles to the axis X—X, the inner chamber 1e is polygon such as square and hexagon and extends over an area having a dimension which is much greater than the cross-sectional area of the hole 1d. The shoulder wall 1f which is disposed between the central portion 1a and the inner chamber 1e and constitutes the outermost wall of the inner chamber 1e is at right-angles to the central portion 1a and the peripheral wall of the inner chamber 1e.

In the outer portion of the inner chamber 1e there is provided the metal nut 2 whose forward end surface is in contact with the shoulder wall 1f and the ring 3 which is made of soft synthetic resin and whose outer end surface is in contact with the inner end surface of the nut 2. In transverse cross-section both the nut 2 and the ring 3 have the same size and shape as the inner chamber 1e, whereby the nut 2 and ring 3 fit exactly in the outermost portion of the inner chamber 1e. The nut 2 defines a threaded hole 2a which is coaxial with the central hole 1d in the central portion 1a and has the same diameter and threaded pitch as the bolt B, which can therefore be screwed through the nut 2. The synthetic resin ring 3 defines a central hole 3a, which is also coaxial with the central hole 1d, extends completely through the ring 3, and has a diameter which is generally equal to or slightly larger than the root or minor diameter of the bolt B but substantially smaller than the outer or threaded diameter of the bolt B and a thickness effective to produce a holding force on an inserted bolt B which may be considered to constitute a tightening torque which prevents turning of the bolt B and is not larger than a certain maximum value in order not to bring a risk of the bolt B or ring 3 being damaged by screwing-in of the bolt therein.

In the inner end portion of the inner chamber 1e there is fitted a box-like retainer element 4, which is made of plastics and defines a central open space 4a having a transverse cross-sectional area much larger than the cross-sectional area of the bolt B, the outer end surface of which contacts the inner end surface of the ring 3, and the inner-most bottom portion 4b of which is level with the inner end portion of the inner chamber 1f which defines an inner flange 1g of the bolt-seating plug A, and contacts the inner end of an excavation of the concrete structure C in which the bolt-seating plug A is located, the excavation being provided by means of the concrete depositing around the bolt-seating plug A. The retainer element 4 thus serves to hold the nut 2 and ring 3 in the outermost portion of the inner chamber 1f, while leaving a clear space 3b on the inner side of the ring 3.

In the outer end portion of the cylindrical body 1 between the outer flange 1b and cylindrical portion 1a there is provided an outer chamber 1h for accommodation of the seal element which defines the outer end of the central hole 1d and is constituted by the rubber packing element 5 and metal seal retainer ring 6. The packing element 5 is flared and gradually increases in thickness towards the periphery thereof, which is defined by a broad rim 5a which assists retention of the packing element 5 in the cylindrical body 1. The outer chamber 1h of the cylindrical body 1 is shaped to permit exact fitting of the inner surface of the packing element 5 against it. In the central portion of the packing element 5 there is defined a hole 5b which has a diameter equal to or slightly smaller than that of the shank of the bolt B. The seal retainer ring 6 has an inner surface 6a which is shaped to fit exactly against the outer surface of the packing element 5, and fits tightly in and has an outer surface level with that of the cylindrical body 1. On the outer peripheral portions of the cylindrical body 1 including the main portion and inner and outer chambers there is provided a number of radially disposed ribs 1i and longitudinally disposed ribs 1j, the former being disposed at right angles to the axis X—X for ensuring the prevention of withdrawing thereof while the later is disposed in parallel with the axis X—X to ensure the prevention turning thereof within the concrete construction.

With the abovedescribed construction, the bolt B, which may of course by provided with a suitable washer D or washers for mounting of fenders or similar elements E, is inserted through the hole 5b in the packing element 5, through the central hole 1d, and then screwed through the hole 2a in the metal nut 2. Since the nut 2 has a polygon periphery and is prevented from moving inwards by the retainer element 4, acting through the ring 3, it remains stationary while the bolt B is being screwed therethrough, and effecively holds the bolt B.

After passing through the nut 2, the threaded end of the bolt B is partly screwed and partly forced through the synthetic resin ring 3, the bolt B thus biting into the ring 3 with the result that the ring 3 grips and acts to apply supplementary holding force on the bolt B. Supplementary tightening force must of course be imposed on the bolt B in order to move it through the ring 3, and the thickness T of the ring 3 is selected in reference to the degree of softness or flexibility thereof and is such that the ring 3 may effectively act to apply requisite supplementary holding force on, or torque to prevent unscrewing of, the bolt B, the value of torque being not larger than a certain maximum value to be caused to damage the bolt B or bolt-seating plug A and the force required to screw the bolt B through the hole 3a being not sufficiently to cause splitting of the material of the ring 3 and breaking of the bolt B. Once the end of the bolt B has passed through the ring 3, it enters the clear space 4a, and the bolt B may therefore be screwed down completely by application of comparatively slight additional tightening torque. During screwing of the bolt B through the ring 3, the ring 3 remains stationary, for the same reasons as noted for the nut 12.

When the bolt B is completely screwed down, it is held by the nut 2 and ring 3, and the head thereof is held, directly or through washers, on the outer end of the bolt-seating plug A. The shank of the bolt B, which has a diameter equal to or larger than that of the hole 5b of the rubber packing element 5, as noted earlier, fits tightly in and completely fills the hole 5b, and so the seal element is effective in preventing entry of water, etc., into the inner portion of the bolt-seating plug, and the bolt B is protected from corrosion. A further advantage is that since the shoulder wall 1f of the inner chamber 1e containing the nut 2 and ring 3 has a transverse cross-section greater than that of the central portion 1a of the plug A, force acting to withdraw the bolt B from the plug A, i.e., force for fixing the bolt B in the concrete structure C by means of the plug A is transmitted through the nut 2 and ring 3 and the shoulder wall 1f of the inner chamber 1e to the concrete structure C as a compressive force which is not a shearing force effective to cause breakage of the central portion 1a of the plug A.

Depending on application, the bolt-seating plug A may be set in place by having concrete poured directly around it, by being inserted in concrete immediately after pouring of the concrete, or by being inserted in an approximately dimensioned excavation which is made in solidified concrete and subsequently filled with sulfur cement, for example. To give improved holding ability to the bolt-seating plug itself, and to ensure prevention of turning thereof, the plug A is provided a number of radially disposed ribs 1i and longitudinally disposed ribs 1j.

Although the present invention has been fully described by way of example with reference to the attached drawings, it should be noted that various changes and modifications are apparent to those skilled in the art. Therefore, unless otherwise such changes and modifications depart from the scope of the present invention, they should be construed as included therein.

What is claimed is:

1. A bolt-seating plug comprising
   a cylindrical body made of rigid synthetic resin having a central portion which defines a central hole with a diameter slightly greater than that of a bolt to be inserted, and a fixture block which is provided in integral continuation to the inner end of said central portion and defines an inner chamber communicating with said central hole and having a polyhedron configuration with greater transverse dimensions than the cross-sectional area of said central hole on the provision of a shoulder wall between said central hole and inner chamber, a seal element provided in the entrance of said central hole to seal hermetically a gap between said central portion and bolt,
   a metal nut which is accommodated in and has an outer surface in contact with said shoulder wall of said inner chamber and defines a threaded through-hole for permitting said bolt to be screwed therethrough,
   a ring made of soft synthetic resin which is accommodated in said inner chamber, contacts with the inner surface of said nut and has an through-hole for permitting said bolt to be bitten therethrough, and
   a retainer element which is accommodated in said inner chamber, keeps said ring and nut in the outermost portion of said inner chamber, and defines an open space large enough to permit unhindered entry thereinto of the end portion of said bolt.

2. A bolt-seating plug as claimed in claim 1, wherein said cylindrical body further comprises at least one longitudinally disposed rib which is integrally provided as a projection onto the outer surface thereof.

3. A bolt-seating plug as claimed in claim 1, wherein said cylindrical body further comprises at least one radially disposed rib which is integrally provided onto the outer surface thereof.

4. A bolt-seating plug as claimed in claim 1, wherein said ring has a thickness such that it may contribute to a required degree to bolt-holding force but that force required to screw the bolt therethrough is not liable to cause breaking of said ring and bolt.

5. A bolt-seating plug as claimed in claim 1, wherein said sealing element comprises a rubber packing element which defines a hole which is coaxial with said main central hole and has a diameter equal to or slightly less than the diameter of said bolt, has an outer periphery defined by a rim portion, and increases in thickness from central portions thereof towards said rim portion, said cylindrical body portion defining wall portions which corresponding in shape to and permit exact fitting thereon of the packing element, and a retainer ring made of synthetic resin, is provided on the outer side of said packing element, and has a flat outer surface and an inner surface which is shaped to permit exact fitting thereof against the outer surface of said packing element.

* * * * *